United States Patent Office 3,634,306
Patented Jan. 11, 1972

3,634,306
MOISTURE-CURING POLYURETHANES SOLUBLE IN MINERAL SPIRITS

Herbert M. Schroeder, Williamsville, and David W. Teloh, Depew, N.Y., assignors to Textron Inc.
No Drawing. Filed Sept. 1, 1967, Ser. No. 664,960
Int. Cl. C08g 51/28
U.S. Cl. 260—33.6 UR                           27 Claims

ABSTRACT OF THE DISCLOSURE

Solvent solutions of moisture-curing polyurethanes made from a polyol component containing branched chain polyoxybutylene polyol in order that a paraffinic or alicyclic hydrocarbon-containing solvent can be employed and still obtain essentially clear solutions. Such solvents are especially advantageous in view of pollution problems encountered with aromatic, olefinic and oxygenated solvents. A highly preferred diisocyanate is 1-isocyanato-3-isocyanatomethyl-3,5,5-trimethylcyclohexane whose use permits the production of solutions having at least about 70 or 80% of the paraffinic or alicyclic hydrocarbon solvent components.

---

This invention relates to polyurethane compositions, and, more particularly, the invention concerns moisture-curing polyurethane prepolymer compositions which have a free isocyanate group content and contain a substantial portion of paraffinic or alicyclic hydrocarbon solvent. The moisture-curing polyurethane prepolymer is made essentially from hydrocarbon diisocyanate and polybutylene polyol and in the compositions of this invention the prepolymer is dissolved in a solvent which is to a substantial, preferably a major, weight extent composed of paraffinic or alicyclic hydrocarbons. The solvent solutions of prepolymer are especially useful as moisture-curing polyurethane coating compositions to be applied to solid substrates, where the conditions are such that the use of photochemically-sensitive solvents such as those composed to an undesirable extent of aromatic or olefinic hydrocarbons or oxygenated solvents, is objetcionable because of pollution, economic, or other reasons.

Moisture-curing polyurethane coating compositions are isocyanate group-containing prepolymers generally made from, for instance, tolylene diisocyanate and polypropylene glycol, and possibly a minor amount of a lower molecular weight polyol such as trimethylol propane. The prepolymer is formed in a solvent which is often an aromatic hydrocarbon or an oxygenated material, e.g., ester, ether, ketone, etc. If the resulting prepolymer solution is too high in viscosity for use, for instance, as a coating, the formulation can be diluted to application viscosity by the addition of further quantities of solvents similar to those used when forming the prepolymer. Quite often the solvents are mixtures of aromatic hydrocarbons and oxygenated materials, e.g. xylene and Cellosolve acetate.

Among the factors detracting from more extensive commercial utilization of these polyurethane prepolymer solutions is the necessity for employing solvents of undesirable characteristics. The oxygenated solvents are expensive, toxic and odoriferous when placed in the atmosphere during curing of the polyurethane, and even though these materials exhibit outstanding solvency towards the prepolymers the undesirable properties have prevented or may soon prevent wider use of the coating compositions. When turning to the less expensive solvents of hydrocarbon nature, it has been necessary to employ large amounts of aromatic hydrocarbons which are becoming under increasing attack as atmospheric pollutants. The aromatic hydrocarbon solvents, especially toluene, xylenes and higher boiling aromatics, along with olefinic hydrocarbons are photochemicallysensitive and thus are smogformers in the daylight atmosphere due to photochemical oxidation. Also the lower boiling aromatics such as ethylbenzene, toluene and benzene are toxic, odoriferous and highly volatile, and their drying may be so fast that adequate working time is not afforded when applying the coating to a substrate.

At present, two of the most restrictive jurisdictions on air pollution are the San Francisco Bay Area and Los Angeles Air Pollution Control District. Without repeating the details of the regulations enforced by these areas it suffices to say that their rules place various restrictions on the amounts of aromatic, olefinic and certain oxygenated compounds that can be employed in coating compositions while the paraffinic and alicyclic hydrocarbons are approved in unlimited amounts. These acceptable hydrocarbons, however, exhibit the least solvency towards the usual moisture-curing polyurethanes. These is, therefore, a need to develop moisture-curing polyurethane prepolymer coating compositions which can be placed in the relatively inexpensive paraffinic and alicyclic hydrocarbon solvents and at the same time provide coatings of desirable characteristics.

By the present invention there has been made moisture-curing polyurethane prepolymers having increased solvency in hydrocarbon solvents of paraffinic or alicyclic configuration. These prepolymers are derived essentially from hydrocarbon diisocyanates and branch chained polybutylene polyols. The compositions, moreover, when placed on a suitable solid substrate and moisture-cured, provide coatings which exhibit rapid curing properties and are chemically resistant, tough, elastic, abrasion resistant and durable. The coatings made from these compositions can belight in color, and when aliphatic diisocyanates are employed the coating films are stable to discoloration upon exposure to sunlight or other ultraviolet light sources and pigmented films made from the prepolymers are gloss retentive. Thus, the prepolymers make excellent finishes for various solid surfaces such as natural wood, and the prepolymers are useful in seamless flooring and in paints or enamels exposed to interior or exterior conditions.

The term polybutylene polyols as designated herein refers to those polyoxybutylene ethers having at least two hydroxyl groups which are generally considered to be at the terminals of a polyether chain, and these polyols can be composed in part or entirely of diol or triol materials or their mixtures, and polyols predominating in diol on a weight basis are preferred reactants. The polybutylene polyols employed in this invention have branched chain alkyl groups which distinguish these components from the linear tetramethylene ether glycols that have been found to be unsuitable for preparing the prepolymer solutions of this invention. Thus, the subject polybutylene polyols are composed of a plurality of butyl ether groups in which groups there are two carbon atoms in the main polyether chain and two side chain carbon atoms, the latter being either as an ethyl group or two methyl groups disposed on separate ones of the two carbon atoms in the main polyether chain. The average molecular weights of the polybutylene polyols are often from about 375 up to about 5000 or more, preferably about 750 to 300. These polybutylene polyols can be made from 1,2- or 2,3-butylene oxides or their mixtures.

Since the polybutylene polyols are often made by reacting the butylene oxides with an appropriate amount of a polyhydroxy compound the products can be of the formula:

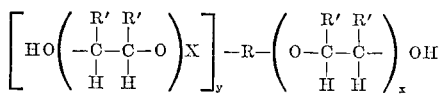

wherein R is a hydrocarbon radical of aliphatic, including cycloaliphatic, aromatic or mixed aliphatic-aromatic character, preferably aliphatic such as paraffinic, and often has a molecular weight of up to about 200 or more, preferably up to about 150; R' is hydrogen, methyl or ethyl selected to give polyether groups having a total of four carbon atoms; $x$ is a number and the total of all $x$'s is about 4 to 50 or more, preferably about 10 to 30, and $y$ is at least 1 and preferably is 1 or 2. A polybutylene polyol having almost entirely ethyl substitution in the butyl ether groups is a suitable reactant.

The diols are often made from a nucleus of a lower glycol such as ethylene glycol, propylene glycol or butylene glycol, while the triols can be synthesized from a trihydroxy lower alcohol such as trimethylol propane or a hexanetriol. These polyols can be reacted with the 1,2- or 2,3-butylene oxides to give the polybutylene polyols used in this invention. The triol and higher polyol derivatives exhibit cross-linking tendencies and, therefore, the coating solutions resulting from the use of these derivatives generally have higher viscosities, are less soluble and have faster curing rates as the amount of these derivatives in the prepolymer increases as compared with diol, which also can result in harder and more brittle coatings.

Aside from the branched polybutylene polyol component used in making the prepolymer compositions of the present invention, there may also be used in the reaction one or more other aliphatic polyols, for instance, diols, triols, other polyols, including the ether polyols, or their mixtures. The prepolymers of this invention thus have at least about 25 mole percent of the branched polybutylene polyol based on the total polyol employed, and preferably at least about 40 mole percent. The additional polyols, i.e. those other than the branched polybutylene polyols, have at least two hydroxyl groups attached to aliphatic carbon atoms, and may be selected from a wide variety of polyhydroxyl materials which may be aliphatic, including cycloaliphatic, hydrocarbon compounds, including substituted-hydrocarbon compounds. A minor amount of aromatic polyols or phenols may, if desired, be included in the polyurethane prepolymers but their presence may lead to unsatisfactory results. The arritional polyol may have a molecular weight up to about 5000 or more, but preferably has a molecular weight of up to about 200. As the molecular weight of the additional polyol increases at a given NCO/OH ratio in the reaction mixture for forming moisture-curing prepolymers, cured coatings of decreased hardness are obtained. On the other hand the same amount of isocyanate if employed with low molecular weight polyols can lead to moisture-cured coatings which are hard and bittle. Thus in moisture-cured coatings, brittleness and hardness are in general increased as the amount of diisocyanate is increased or the molecular weight of the polyol is reduced.

Representative of the additional polyol classes and individual compounds useful in making the various prepolymers are given below. In making the moisture-curing prepolymers of this invention it is preferred that the major portion by weight of the total polyol component have a molecular weight of at least about 500. Also, when the polyol component used in making moisture-curing prepolymers contains lower molecular weight aliphatic polyol, which will often be the minor amount by weight of the total polyol, such lower molecular weight material preferably has a molecular weight of up to about 200. Sometimes in such cases the low and high molecular weight polyols (molecular weight above about 500) are used in approximately equal molar ratios.

The additional aliphatic polyols which can be employed in making the polyurethane-type prepolymers or cured products of the present invention may be one or more polyhydric alkanols which can be the only additional polyol used or other polyols may also be employed. The additional aliphatic alcohols usually have at least 2 carbon atoms, and among the wide variety of such materials which can be used are those represented by the formula:

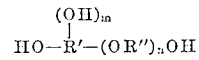

in which R' is an aliphatic hydrocarbon radical, preferably saturated, and R" is an alkylene radical of 2 to 4, preferably 2 to 3 carbon atoms, R' preferably has 2 to 12, advantageously 2 to 6, carbon atoms. The letter $n$ represents a number from 0 to about 50, and if not 0, may often be 2 to 30 or even about 5 to 30, for more flexible coatings, while the letter $m$ is 0 to 2 or more. When $n$ is other than 0, R' may often be the same as R". The aliphatic alcohol reactant can be substituted with non-deleterious substituents.

Suitable of the additional aliphatic alcohols are the polyether glycols of up to about 5000 or more average molecular weight, such as the polyethylene glycols, for instance, of up to about 3000 molecular weight, propylene glycol, polypropylene glycols, for instance, of up to about 3000 molecular weight, ethylene glycol, glycerol, polytetramethyl ether glycol, trimethylol propane, butane diols, trimethylol ethane, 1,6-hexamethylene glycol, 1,2,6-hexanetriol, sucrose, sorbitol, etc.

Others among the non-drying polyols useful as the additional polyol in the invention include the hydroxy esters such as castor oil, polyol-modified castor oils, other polyol-modified non-drying oils and hydroxy-terminated polyesters. The hydroxy-terminated polyester materials are generally made by reaction of one or more aliphatic polyhydroxy alcohols, such as the aliphatic polyols mentioned above, with one or more aliphatic, including cycloaliphatic, or aromatic polycarboxylic acids or esters, and such polyesters may have hydroxyl values in the range of about 25 to 150. Frequently in these polyesters, the polyhydroxy alcohols are predominantly diols and the acids are dicarboxylic acids, including their anhydrides, and preferably contain from 4 to 50 carbon atoms, e.g., phthalic acid, adipic acid, sebacic acid, dimers of olefinically-unsaturated monocarboxylic acids, such as linoleic acid dimer, etc. Modified castor oil partial esters can be made by ester interchange of the oil with polyols such as low molecular weight polyols, including glycols, glycerine, pentaerythritol, etc.

In making the urethane prepolymer one or more of a variety of hydrocarbon diisocyanates can be employed. Thus, the diisocyanate may be aliphatic, aromatic or mixed aliphatic-aromatic structures. The aliphatic diisocyanates are preferred, especially when making urethanes exhibiting good resistance to the yellowing effects of ultraviolet light. The aliphatic diisocyanates include those having cycloaliphatic configurations. The isocyanates may be substituted with non-interfering groups such as aliphatic hydrocarbon radicals, e.g., lower alkyl groups. The hydrocarbon portion of the diisocyanate often has at least about 4 carbon atoms and usually does not have more than aobut 24 carbon atoms. Diisocyanates of about 6 to 20 carbon atoms in the hydrocarbon group are preferred. Suitable diisocyanates include completely hydrogenated di-(isocyanato phenyl) methane, 1-isocyanato-3-isocyanatomethyl - 3,5,5 - trimethyl cyclohexane, hexamethylene diisocyanate, completely hydrogenated toylene diisocyanate, 2,4,4-trimethylhexamethylene diisocyanate, 2,6-tolylene diisocyanate, 2,4-tolylene diisocyanate, p-phenylene diisocyanate, p,p'diphenylmethane diisocyanate, 1,5-naphthalene diisocyanate, substituted aromatic and aliphatic diisocyanates, etc. The use of aromatic diisocyanates lowers the resistance of the urethane polymers to the effects of ultraviolet light and the presence of diisocyanato dicyclohexyl methane makes the prepolymers more susceptible to gellation. Although diisocyanate is essential in preparing our prepolymers, minor amounts of other polyisocyanates may be present providing the compositions are not unduly deleteriously affected.

Highly preferred prepolymers can be made by using 1-isocyanato-3-isocyanatomethyl-3,5,5 - trimethyl cyclohexane as the essential diisocyanate. Such prepolymers are particularly advantageous since they can be diluted with the paraffinic or alicyclic hydrocarbon solvents to low solids content and yet still obtain essentially clear solutions. Thus when employing 1-isocyanato-3-isocyanato-methyl-3,5,5-trimethyl cyclohexane the solvents of the prepolymer solution may be at least about 70 weight percent, or even at least about 80 up to about 100 weight percent, paraffinic or alicyclic hydrocarbon in character. Coatings prepared from such solutions cure quickly to light colored, chemically-resistant, tough, elastic, resilient, abrasion resistant and durable films. These films or other products made from such prepolymer solutions are stable to discoloration on exposure to sunlight and pigmented products from the prepolymer solutions are gloss retentive. German Pat. 1,202,785 and Belgium Pat. 666,023, disclose 1-isocyanato-3-isocyanatomethyl-3,5,5 - trimethyl cyclohexane which can be made by phosgenation of 1-amino-3-aminomethyl-3,5,5-trimethyl cyclohexane, preparation of the latter being described in Belgium Pat. 621,259.

The prepolymer solutions of this invention contain, as noted above, as an essential ingredient a paraffinic or alicyclic hydrocarbon or their mixtures. The paraffinc materials may be normal or branched chain, while the alicyclic hydrocarbons include the branched or unbranched cycloparaffinic or naphthenic hydrocarbons which may contain a minor amount of olefinic unsaturation. From an economic standpoint there is usually employed a mixture of such hydrocarbons which are generally separated or made from mineral oil sources, especially from petroleum. Accordingly, the most economically feasible solvents are mineral oil distillates such as mineral spirits and VM/P naphtha of appropriate hydrocarbon constituency.

The paraffinic or alicyclic hydrocarbon solvents can be combined with the urethane prepolymer after its formation but it is most advantageous to prepare the prepolymer in the presence of a solvent composed to a substantial extent of such paraffinic or alicyclic solvents. The paraffinic or alicyclic hydrocarbon and other hydrocarbons and oxygen-containing materials used as solvents boil primarily in the range of about 200 to 400° F. VM/P naphthas often boil essentially below about 300° F. while mineral spirits can boil primarily in the range of about 300 to 400° F. Due to the composition of the urethane prepolymer of this invention, solvents having a greater amount of paraffinic and alicyclic hydrocarbons can be employed and still obtain essentially clear solvents than is possible with the usual moisture-curing polyurethanes. Thus the total hydrocarbon solvent components in the solutions of this invention have a maximum Kauri-Butanol value of about 50. Xylenes have a Kauri-Butanol value of about 100.

Although the products of this invention are designated as solutions, they may or may not be true solutions, but in any event they are essentially clear in the absence of pigmentation. Due to the nature of the moisture-curing urethane prepolymer of this invention a greater amount of the low Kauri-Butanol value hydrocarbon solvent can be included in the composition and obtain a clear solution than is possible when employing other polyurethane prepolymers. The solutions of this invention contain at least about 30 weight percent of hydrocarbon solvent, including at least about 15 weight percent of the paraffinic or alicyclic hydrocarbons based on the total solution. Based on the solvent components, the paraffinic or alicyclic hydrocarbons preferably comprise a major weight extent or even all of the solvent as long as an essentially clear solution can be obtained. Often the total urethane solids or prepolymer in the solvent solution is about 30 to 70 weight percent, especially in coating compositions. The amount of solvent employed can depend on the viscosity desired for the final product. The solution may, for instance, be thick or viscous enough that it can be applied by trowelling but often the viscosity of the solution is up to about 10 poises at 25° C. and for many applications the viscosity is about 1 poise or less at 25° C.

The urethane polymers of the invention are essentially made by reaction of the diisocyanate with the polybutylene polyol and additional polyol, if used. The urethanes prior to curing, which may take place after application of the urethane prepolymer as a coating, are in the essentially liquid state at least when dissolved in the solvent. The uncured polymer or prepolymer is generally stable in the sense that the prepolymer will not cure to a solid unless further contacted with an active hydrogen material such as water. The prepolymer-forming reaction mixture often contains a ratio of total isocyanate groups to total hydroxyl radicals of about 1.2 to 3:1, preferably 1.3 to 2.5:1, and the ratio of isocyanate groups to hydroxyl groups can affect the properties of the moisture-curing coating compositions. Increases in the ratio give coatings of greater film hardness and chemical resistance while flexibility and impact resistance may be adversely affected. Also, larger amounts of free isocyanate groups increase the toxicity and cost of the compositions. The free isocyanate groups in such prepolymers are often from about 3 to 12 weight percent, with about 5 to 10 percent being preferred, based on polymer content or solids of the prepolymer solutions.

The polyurethane prepolymer reaction products of the present invention can be made by simultaneous reaction of an excess of diisocyanate with the polyol. Alternatively, the diisocyanate can be reacted with part of the polyol prior to the reaction with the remaining portion of this material. Stepwise mixing of the diisocyanate with the polyol may be used to enhance temperature control. The reaction temperatures for making the urethane prepolymers of the present invention are often in the range of about 40 to 150° C., with about 50 to 130° C. being preferred; and the reaction is preferably continued until there is essentially little, if any, unreacted hydroxyl functionality remaining. Catalysts may be used in forming the prepolymers to accelerate the rate of reaction, e.g. the catalysts may be similar to those which can be employed to accelerate curing.

The rate of curing of the coating composition of this invention may be enhanced as desired by incorporation of appropriate amounts of a catalyst which promotes the reaction of isocyanate groups with water. Typically organotin compounds, for example dibutyl tin dilaurate and stannous octoate may be used. Other useful catalysts include tertiary aliphatic and alicyclic amines, such as triethyl amine, triethanol amine, tri-n-butylamine, triethylene diamine, alkyl morpholines and the like. Complex mixtures containing such catalysts in modified form may also be employed. In any event the free isocyanate groups in the prepolymer when exposed to moisture of the atmosphere form cross-links which produce tough and relatively permanent coatings.

The prepolymers of the present invention can be prepared in the presence or absence of the essentially inert solvent. The solvent serves to insure that the reactants are in the liquid state and the solvent permits better temperature control during the reaction by serving as a heat sink and, if desired, as a refluxing medium. The solvents are volatile and will be removed from the composition while it cures, for instance as a coating or film, and in such case, there may be no need to remove any portion of the solvent from the reaction product prior to application as a coating. The amount of solvent employed may vary widely and large volumes may be uneconomic or give materials with undesirably or inconveniently low viscosity. The amount of solvent may be selected in order to provide a reaction product of film application viscosity, but products of greater viscosity can be cut-back before use. Often about 0.4 to 6 weights of solvent, preferably about 0.5 to 3 weights of solvent, per weight of the total isocyanate and polyol are used.

The coating compositions of this invention are often applied to solid substrates as films of less than 10 mils thickness and can obtain other additives to impart special properties such as plasticizers, etc. Also, the substrate for the coating may be specially treated materials, including flammable members impregnated with fire-resistant chemicals or coated with a sealant.

The following examples will serve to illustrate the present invention. In the examples the parts and percents indicated are by weight unless indicated otherwise, and the final solutions were essentially clear.

EXAMPLE I

A mixture of 382 g. of 1000 molecular weight polyoxybutylene glycol (PBG-1000) having a hydroxyl value of 108 and analyzing by nuclear magnetic resonance as the 1-ethyl-type of polybutylene glycol, 49.4 g. of trimethylol propane, 3.4 g. of 2,6-ditertiary butyl-4-methylphenol and 30 g. of AMSCO (W-2) regular mineral spirits (boiling range 309–392° F., Kauri-Butanol value of 35 and having about 14 vol. percent aromatic hydrocarbons and about 0.3 vol. percent olefins) was heated to 158° C. for 2 hours to remove water from the reactants. After cooling the mixture to 90° C., 265 g. of tolylene diisocyanate (80/20—2,4/2,6 isomers used in this and the following examples) were added. The resulting reaction mixture was maintained at about 95° C. for 2.5 hours. An additional 454 g. of the mineral spirits were added during a 3 hour period while maintaining the reaction mass at about 77° C. The urethane prepolymer vehicle thereby produced was then reduced from 60% non-volatile by adding a higher boiling aromatic hydrocarbon solvent (boiling range 322–351° F. and Kauri-Butanol value of 93 and having about 99% aromatic hydrocarbons) to obtain a product of 2 stokes viscosity, 47.9% non-volatile, Gardner color of less than 1 and a free isocyanate group content (NCO) of 3.5%. On the basis of solids, 1% of N-coco morpholine was added. A 3 mil wet film of the prepolymer was found to "set" in 30 minutes and "thru dry" in 2 hours. The Sward hardness of the cured film at 1, 3 and 7 days was 6, 12 and 22, respectively.

EXAMPLE II

A mixture of 346 g. PBG-1000, 39 g. of trimethylol propane, 2.6 g. of butylated hydroxy toluene and 30 g. of VM&P naphtha (boiling range 248–293° F., Kauri Butanol value of 34 and having 6 vol. percent aromatic hydrocarbons and about 0.1 vol. percent olefins) was heated to distill the VM&P naphtha and the adventitious water. After cooling the mixture, 227 g. of tolylene diisocyanate were added. The reaction temperature was maintained at 90–100° C. for 3.5 hours, and then 400 g. of the VM&P naphtha were added during a 45 minute period. The clear resultant urethane prepolymer vehicle had a viscosity of 4.2 stokes at 59.3% non-volatile, a Gardner color of less than 1 and free isocyanate group (NCO) content of 4.5%. After the addition of 0.25% (on solids) of dibutyl tin dilaurate to the prepolymer, a 3 mil wet film of the material was cast. The film was "set" in 45 minutes and "dried through" in 4 hours. The cured film exhibited a Sward hardness after 1 day and 7 days of 18 and 20, respectively.

EXAMPLE III

A mixture of 562 g. of PBG-1000, 74 g. trimethylol propane, 5 g. of 2,6-ditertiary butyl-4-methyl phenol and 30 g. of the regular mineral spirits of Example I was heated to 230° C. to distill off 22 g. of the mineral spirits and the adventitious water present. After cooling the mixture to 90° C., 397 g. of tolylene diisocyanate were added and the reaction was continued at about 90° C. for 3 hours. During a subsequent period of 1.5 hours, 439 g. of the same mineral spirits were added to the reaction mixture. The resulting urethane prepolymer vehicle had a viscosity of 55 stokes at 69% non-volatile, a Gardner color of less than 1 and a free isocyanate group (NCO) content of 5.1%. The product was reduced to 60% non-volatile with the same mineral spirits and had a viscosity of 15.5 stokes. The addition of more of the mineral spirits gives a cloudy product. When the 60% non-volatile material was reduced to 40% non-volatile with xylene a vehicle of 0.14 stokes viscosity and 1-Gardner color was obtained.

EXAMPLE IV

A mixture of 1100 g. of PBG-1000, 123 g. of trimethylol propane, 8.4 g. of 2,6-ditertiary butyl-4-methyl phenol and 30 g. of toluene was heated under an inert gas to reflux temperature and ultimately to 150° C. to distill off the toluene and water in the reactants. The temperature of the mixture was lowered to 85° C., and 723 g. of tolylene diisocyanate was added. The initial reaction was conducted at 90° C. for 3 hours, and then over a 5 hour period at 70–80° C., 1310 g. of the regular mineral spirits of Example I were added. The resultant urethane prepolymer vehicle had a viscosity of 2.5 stokes at 52.9% non-volatile, Gardner color of less than 1 and 4.05% NCO after the addition of 296 g. of the higher boiling aromatic solvent of Example I. The product was slightly cloudy at 60% non-volatile before the addition of the aromatic solvent. To the 52.9% non-volatile product were added 340 g. of the mineral spirits and 740 g. of the higher boiling aromatic solvent to obtain a vehicle at 40% non-volatile. Also added to the vehicle as a polymerization catalyst was 1.8 g. of dibutyl tin dilaurate. Further polymerization of the vehicle was conducted at 130° C. for 2 hours during which time the viscosity increased from 0.2 to 2.0 stokes at 39.4% non-volatile, 2.65% NCO and a Gardner color of less than 1. A three mil wet film of the latter material was cast on a Morest Chart and found to "set" in 30 minutes, to be "through dry" in 2 hours and to be "dry hard" in 3 hours. At 24 hours the film possessed a Sward hardness of 16 and exhibited excellent adhesion, gloss, color and flexibility.

EXAMPLE V

A mixture of 258 g. of PBG-1000, 5.4 g. of 2,6-ditertiary butyl-4-methyl phenol and 262 g. of the regular mineral spirits of Example I was heated to 180° C. to remove adventitious water. After cooling the mixture to room temperature, 130 g. of 4,4'-methylene bis(cyclohexyl isocyanate) and 0.4 g. of dibutyl tin dilaurate were added. The mixture was reacted at a temperature of 80° C. for 3.5 hours. The resultant urethane prepolymer vehicle had a viscosity of 1.9 stokes at 62.4% non-volatile with 3.16% NCO and a Gardner color of 1. A 3 mil wet film of the vehicle was found to "set" in 4.5 hours and to be "tack-free" in 21 hours. The glossy, colorless film was also substantially non-yellowing in the presence of ultraviolet light.

EXAMPLE VI

A mixture of 350 g. of PBG-1000, 49.4 g. trimethylol propane, 3.4 g. 2,6-ditertiary butyl-4-methylphenol and 30 g. of the regular mineral spirits of Example I was heated to 200° C. to remove adventitious water. After the mixture was cooled to 80° C., 16 g. of N-tertiary butyl urea and 277 g. of tolylene diisocyanate were added. The reaction mass was maintained at about 90° C. for about 4 hours, after which 466 g. of the mineral spirits were added during a 2 hour period maintaining a temperature of about 80° C. Since this product at 60% non-volatile was hazy, it was diluted to 50% non-volatile with the higher boiling aromatic solvent of Example I to obtain a urethane preoplymer product having a viscosity of 34 stokes at 50.8% with an isocyanate content of 3.55%. The vehicle was catalyzed with 0.5%, on non-volatile, of dibutyl tin dilaurate. A 3 mil wet film of the vehicle was found to "set" in 45 minutes, to be "through dry" in 205 minutes and to be "dry hard" in 265 minutes. The film was found to have a Sward hardness of 13, 29, 30 at 4 hours, 1 and 7 days, respectively.

EXAMPLE VII

A mixture of 281 g. of PBG–1000, 37 g. of trimethylol propane, 30 g. of odorless mineral spirits (boiling range 175–200° C. and Kauri-Butanol value of 26) was heated to distill the solvent and the adventitious water. After cooling the mixture to 60° C., 198.5 g. of tolylene diisocyanate and 13 g. of dioctyl thiourea were added. After a reaction time of 3 hours at about 90° C., 225 g. of the regular mineral spirits of Example I were added. The reaction mixture was then reduced in non-volatiles by the addition of ethoxy ethyl acetate. The resultant urethane prepolymer vehicle had a viscosity of 2.7 stokes at 58.2% non-volatile with a Gardner color of 1— and an isocyanate (NCO) content of 4.4%. Due to the small amounts of aromatic and olefinic hydrocarbons and oxygen-containing solvent in this composition, it should not contribute to smog and its use is permissible in geographic areas demanding air pollution control.

EXAMPLE VIII

A mixture of 139 g. of about 1000 molecular weight polyoxybutylene triol derived from 1,2-butylene oxide and glycerol (hydroxyl volue 169), 1 g. of butylated hydroxy toluene and 25 g. xylene was heated to 230° C. to distill the oxylene and the adventitious water. After cooling the mixture to room temperature, 62 g. of tolylene diisocyanate were added. After 3 hours at about 90° C., 134 g. of the regular mineral spirits of Example I were added. Since the product was somewhat cloudy, it was reduced to approximately 50% non-volatile with xylene to give a clear vehicle having a viscosity of 0.3 stokes at 48.8% non-volatile with a Gardner color of less than 1, and an isocyanate (NCO) content of 3.1%. After the addition of 4% N-coco morpholine based on solids, a 3 mil wet film of the prepolymer was cast. The film "set" in 1 hour, was "dried through" in 2 hours and "dried hard" in 3 hours. The film possessed high gloss and excellent color and mar resistance.

EXAMPLE IX

A mixture of 139 g. of 1500 molecular weight branched chain polyoxybutylene glycol (hydroxyl value 78), 14.6 g. of trimethylol propane, 1.0 g. of 2,6-ditertiary butyl-4-methylphenol and 25 g. of xylene was heated to about 170° C. for 30 minutes to remove any water from the reactants. After cooling the mixture to room temperature, 4.75 g. of N-tertiary butyl urea, followed by 82 g. of tolylene diisocyanate were added. At the end of the exotherm, heat was applied and the reaction mixture held at about 90–93° C. for 3 hours. The external heat source was removed and 159 g. of the regular mineral spirits of Example I were added. The resulting urethane prepolymer product, which had a non-volatile of 58.9%, an isocyanate (NCO) of 4.16%, and a viscosity of 5.4 stokes, was cloudy. After the addition of 4% N-coco morpholine based on vehicle solids, 3 mil wet film of the prepolymer was "set" in 30 minutes, "through dry" in 1¾ hours, and "dry hard" in 2¾ hours. The above described prepolymer product was reduced to 50 NV with Cellosolve acetate to yield a completely clear and compatible vehicle. A 3 mil wet film of the latter product was "set" in 15 minutes, "through dry" in 1½ hours and "dry hard" in 2½ hours. A high gloss clear, tough film was obtained with excellent mar resistance with or without the addition of the Cellosolve acetate to the vehicle.

EXAMPLE X

A mixture of 254 g. of PBG–1000, 33.4 g. trimethylol propane, 2.4 g. butylated hydroxy toluene, and 30 g. xylene was heated in a one liter flask, under a nitrogen atmosphere and with stirring. The temperature was held at about 190° C. and ½ hour and the distillate collected and discarded. When the reaction mixture had cooled to room temperature, 1.2 g. of dibutyl tin dilaurate and 191 g. of methylcyclohexane diisocyanate, equivalent weight about 90, were added. An exotherm caused the temperature of the reactants to reach 110°, even with an external cooling bath applied. The temperature was maintained at approximately 90° C. for three hours, at which time 319 g. of mineral spirits of Example I, were added. A urethane prepolymer product resulted with the following analytical constants: percent non-volatile 66.8 percent isocyanate 4.05 (NCO), viscosity 90.7 stokes, and Gardner color of less than one. Reducing the percent non-volatile in the prepolymer from 66.8 to 38 with Cellosolve acetate, produced a vehicle with a viscosity of 0.144 stokes. The solvent contained less than 8% aromatics as specified for smog control. A 3 mil wet film of the latter material "set" in ½ and was "dry thru" in 11½ and "dry hard" in about 24 hours. After an exposure of 4 hours to a high intensity ultraviolet light, no yellowing of the cured film was observed.

EXAMPLE XI

A mixture of 111 g. of PBG–1000, 14.6 g. trimethylol propane, 1.0 g. butylated hydroxy toluene, and 30 g. xylene was added to a 500 milliliter flask with stirring and a nitrogen blanket. The flask was also equipped with a thermometer, condenser, and Dean Stark water trap. Heat was applied and the mixture brought to and held at approximately 175° C. for ½ hour, at which time the heat was removed and the collected distillate was discarded. At room temperature 0.6 g. dibutyl tin dilaurate and 113 g. trimethyl hexamethylene diisocyanate (mixed 2,2,4 and 2,4,4-isomers) were added and the exotherm raised the temperature to 90° C. This temperature was maintained for 3 hours at which time 160 g. of the mineral spirits of Example X were added. This urethane prepolymer product had a percent non-volatile of 63.8, a percent isocyanate of 5.53 (NCO), a viscosity of 0.50 stoke, and a Gardner color of one minus. To 100 g. of the product described above were added 42 g. of Cellosolve acetate, reducing the percent non-volatile from 63.8 to 45.0. The resulting product had a viscosity of 0.144 stoke and its solvent contained less than 8% of total aromatics. A 3 mil wet film of the latter product was "set" in 1, "dry thru" in 11 and "dry hard" in about 24 hours. When exposed to high intensity ultraviolet light for 4 hours, the film did not discolor.

EXAMPLE XII

To a two liter flask, equipped with a mechanical stirrer, an inlet for gaseous nitrogen, thermometer, and Dean Stark water trap, were charged 303 grams of a branched chain polyoxybutylene glycol whose equivalent weight is about 518, 34 grams of trimethylol propane, 3 grams of 2,6-ditertiary butyl-4-methyl phenol, and approximately 30 grams of xylene. Heat was applied to the mixture by means of an external source and the reaction mixture held at reflux conditions (about 200° C.) for one hour. All of the distillate was drawn off and discarded. Dibutyl tin dilaurate (3.2 grams) and 300 grams of 1-isocyanato-3-isocyanatomethyl-3,5,5-trimethyl cyclohexane were added to the flask at room temperature. An external cooling source was applied to the reaction mixture to keep the temperature from rising above 90° C. The temperature of the reaction mixture was held between 90° C. and 93° C. for three hours. To the flask was next added 920 grams of the regular mineral spirits of Example I and 2.13 grams of magnesium neodecanoate (3 percent magnesium). This mixture was heated to 130° C. and held at this temperature until its viscosity was 0.5 to 0.65 stoke. The resulting urethane prepolymer product had the following analytical constants: percent nonvolatile of 39.7, percent free isocyanate group content (NCO) 2.81, viscosity 0.70 stoke, and Gardner color of one minus. A three mil wet film of this prepolymer vehicle dried to a hard film in 6 hours. Its Sward hardness was 23, 28 and 38 at 1 day, 3 days and 1 week, respectively. When the film was subjected to ultraviolet light from a 400 watt mercury arc lamp at a distance of 18 inches for 2 hours, no yellowing of the film occurred.

EXAMPLE XIII

The following ingredients were added to a one liter flask equipped at described in Example XII: 156 grams of PBG–1000, 17.5 grams trimethylol propane, 1.64 gram butylated hydroxy-toluene, 68 grams ethyl benzene, and 246 grams of mineral spirits (boiling range 157°–184° C., Kauri Butanol value of 32.5, Tagliabue Open Cup Flash Point 42° C., and having an aromatic hydrocarbon content of 5.4 volume percent and 1.6 volume percent olefins). This mixture was heated to and held at 158° C. for one hour, to distill off and collect water present in the raw materials. With the mixture at approximately 26° C., 1.6 grams dibutyl tin dilaurate and 154 grams 1-isocyanato-3-isocyanatomethyl - 3,5,5 - trimethyl cyclohexane were added. Heat was applied by means of a glass mantle heater and the temperature of the reaction mixture held between 90° and 93° C. for three hours. The product was then cut to 40 percent non-volatile by the addition of 160 grams more of the mineral spirits described above. Also added was 2.2 grams magnesium neodecanoate (3% magnesium). The mixture was heated to and held at 130° C. until a viscosity of 0.50 to 0.65 stoke was obtained. The total polymerization time at 130° C. was 2 hours. The resulting urethane prepolymer vehicle had a 40.1 percent nonvolatile content, and a percent isocyanate (NCO) of 2.66, a viscosity of 1.3 stoke, and a Gardner color of one minus. A three mil wet film of the prepolymer vehicle cast on a Morest Chart dried to a hard film in 3¾ hours. The Sward hardness of the film was 34, at 1 day, and 37 at 1 week. When this dried film was exposed for 2 hours to ultraviolet light from a 400 watt mercury arc lamp at a distance of 18 inches, no yellowing or other visible change in the film occurred.

EXAMPLE XIV

Two hundred three grams (0.392 equivalent) of PBG–1000, 22.8 grams (0.507 equivalent) of trimethylol propane and 30 grams of xylene were placed in a one liter flask which was provided with a reflux condenser, a water trap, a thermometer, an inlet for gaseous nitrogen, a motor driven stirrer and a glass mantle for conveying heat to the reaction mixture in the flask. To remove water and dry the mixture it was heated under azeotropic distillation conditions for one hour when 20 grams of distillate was collected in the trap. The mixture was cooled to room temperature and 2.4 grams of dibutyl tin dilaurate and 251 grams (2.24 equivalents) of 1-isocyanato-3-isocyanatomethyl-3,5,5-trimethyl cyclohexane were added while stirring. The heat of reaction raised the temperature of the mixture to 90° C. where it was maintained for 3 hours and then 320 grams of the regular mineral spirits of Example I were added. The mixture was allowed to cool to room temperature. At this point the non-volatile content of the vehicle was 56.5 percent, the isocyanate value was 7.0 percent NCO, viscosity 0.50 stoke and Gardner color one minus. Five hundred sixty-three grams of this vehicle were mixed with 282 grams of the regular mineral spirits of Example I. To this mixture 1.16 gram of a 3 percent solution of magnesium as neodecanoate in mineral spirits was added. This is equivalent to 0.01 percent magnesium based on the nonvolatile content of the vehicle. The resulting urethane prepolymer vehicle was heated for 6 hours at 120°–144° C. until it had a nonvolatile content of 38.8 percent, an isocyanate group content of 3.32 percent NCO, a viscosity of 0.68 stoke and a Gardner color of one minus. A 3 mil wet film of this prepolymer vehicle was cast on a Morest Chart and was found to dry in 2½ hours to a hard condition. Sward hardness of the film was 46 at one week. When this film was exposed for four hours to the ultraviolet light from a 400 watt mercury arc lamp at a distance of 18 inches, no yellowing or other change in appearance of the film occurred.

EXAMPLE XV

Two hundred forty-seven grams (0.476 equivalent) of PBG–1000, 27.8 grams (0.618 equivalent) of trimethylol propane and 30 grams of xylene were placed in a one liter flask which had a reflux condenser, a water trap, a thermometer, an inlet for gaseous nitrogen, a motor driven stirrer and a fiberglass heating mantle. This mixture was heated under conditions of azeotropic distillation for one hour to remove water from it while distilling off 17 grams of xylene. The mixture was then cooled to room temperature when 2.4 grams of dibutyl tin dilaurate and 202 grams (1.8 equivalents) of 1-isocyanato-3-isocyanatomethyl-3,5,5-trimethyl cyclohexane were added with stirring continuing during the whole preparation. Reaction heat raised the temperature of the mixture to 100° C. even with some cooling mixture applied to the reaction flask. The temperature of the mixture was kept at 92°–95° C. for three hours. Three hundred and twenty grams of the regular mineral spirits used in Example I were added to the reaction mixture with stirring. At this point the vehicle had a nonvolatile content of 58.7 percent, an isocyanate group content of 3.52 percent NCO, a viscosity of 4.4 stokes and a Gardner color of one minus.

Five hundred twenty eight grams of the above vehicle was blended with 255 grams of the mineral spirits and 1.06 grams of a 3 percent solution of magnesium as neodecanoate in ordinary mineral spirits. This is equivalent to .01 percent magnesium based on solids. The vehicle was then heated for 1¼ hours at 130°–135° C. with stirring under a blanket of gaseous nitrogen. Seven hundred forty-nine grams of the resulting vehicle were mixed with 106 grams of the higher boiling aromatic hydrocarbon solvent of Example I. The resulting urethane prepolymer vehicle had a non-volatile content of 34.3 percent, a viscosity of 1.45 stokes, an isocyanate content of 1.72 percent NCO and a Gardner color of one minus. A 3 mil wet film of this vehicle dried in 2⅜ hours and showed no yellowing or other change when exposed for four hours to ultraviolet light from a 400 watt mercury arc lamp at a distance of 18 inches. After 2 days the film had a Sward hardness of 24 and at 1 week 28.

EXAMPLE XVI

One hundred sixty one grams (0.31 equivalent) of PBG–1000, 18 grams (0.40 equivalent) of trimethylol propane, and 228 grams VM&P naphtha of Example II were placed in a glass reaction flask which had a motor driven stirrer, a reflux condenser, a Dean Stark water trap, a thermometer, and a fiberglass heating mantle. This mixture was dried by azeotropic distillation by heating at 128°–130° C. for about one hour. When the temperature had fallen to 35° C. after the azeotroping step, 159 grams (1.42 equivalents) of 1 - isocyanato - 3 - isocyanatomethyl-3,5,5-trimethyl cyclohexane and 1.7 grams of dibutyl tin dilaurate were added to the reaction mixture and heating was started after the temperature had risen to 60° C. due to exothermic heat. The temperature was kept at about 90° C. for 3 hours with stirring. At this point 264 grams more of the naphtha and 1.15 grams of 3 percent magnesium as neodecanoate in mineral spirits were added and the temperature raised to 125° C. for 2 hours. After cooling this urethane prepolymer vehicle had a nonvolatile content of 41.1 percent, a Gardner color of one minus, a Gardner viscosity of B and a free isocyanate group content (percent NCO) of 2.88. A 3 mil wet film of this vehicle was cast on a Morest Chart and was found to dry in 6 hours at room temperature. Sward hardness on the film was 26, 32 and 34 at 1 day, 3 days and 1 week, respectively. This film showed no yellowing or other change when exposed to ultraviolet light from a 400 watt mercury arc lamp at a distance of 18 inches for 4 hours.

EXAMPLE XVII

To a 250 milliliter flask equipped with a motor driven stirrer, a nitrogen inlet, a thermometer, a reflux condenser, a Dean Stark water trap and a fiber glass heating mantle were added 70 grams of polyoxybutylene triol of Example VIII and 20 grams of xylene. This mixture was dried by heating to about 180° C. for 30 minutes. The distillate collected in the water trap was discarded. At room temperature 0.6 gram of dibutyl tin dilaurate and 47 grams of 1 - isocyanato - 3 - isocyanatomethyl - 3,5,5 - trimethyl cyclohexane were added. After the exothermic heat of reaction had diminished at about 80° C., heat was applied by means of the heating mantle and the reaction mixture held between 90° and 93° C. for 3 hours. Seventy-eight grams of the regular mineral spirits of Example I were added with continuous stirring. A perfectly clear, compatible urethane prepolymer product resulted. This vehicle had a non-volatile content of 56.3 percent, a percent isocyanate (NCO) of 4.09, a viscosity of 0.93 stoke, and a Gardner color of one minus. A three mil wet film of this vehicle on a Morest Chart dried in 16 hours to a hard film whose Sward hardness was 10 at 2 days and 16 at 1 week. The cured film showed no yellowing or other change when exposed for four hours to the ultraviolet light from a 400 watt mercury arc lamp at a distance of 18 inches from the exposed film.

EXAMPLE XVIII

The following ingredients were added to a 500 milliliter flask: 117 grams of a branched chain polyoxybutylene glycol of approximate equivalent weight of 723, 12.3 grams trimethylol propane, 1.2 grams 2,6 ditertiary butyl-4-methyl phenol, and 25 grams xylene. Heat was applied to the flask, which was equipped with a mechanical stirrer, a nitrogen purge, a thermometer, reflux condenser, and a Dean Stark water trap. The contents of the flask were allowed to reflux for one hour at about 190° C., and the entire distillate collected and discarded. At room temperature, 4.0 grams N-tertiary butyl urea, 1.2 grams dibutyl tin dilaurate, and 105 grams 1-isocyanato-3-isocyanatomethyl-3,5,5-trimethyl cyclohexane were added in that order. When the exothermic heat of reaction had subsided at approximately 77° C., heat was applied by means of a fiber glass heating mantle and the temperature of the reaction mixture held between 92° and 95° C. for three hours. The external heat source was removed and 159 grams of the ordinary mineral spirits of Example I added. A urethane prepolymer product resulted with the following analytical constants: percent non-volatile 58.1, percent isocyanate (NCO) 4.57, viscosity 2.1 stokes, and Gardner color one minus. A three mil wet film of this vehicle set in one, dried through in 7½ and was "dry hard" in 17 hours. The Sward hardness of the film was 45 at one week. This film showed no yellowing or other change when exposed to ultraviolet light from a 400 watt mercury arc lamp at a distance of 18 inches for 4 hours.

It is claimed:

1. An essentially clear liquid solution having about 30–70 weight percent of moisture-curing polyurethane of hydrocarbon diisocyanate and aliphatic polyol, asid aliphatic polyol having at least about 25 moles percent of polyoxybutylene polyol of a molecular weight of about 375 to 5000 and whose polyoxybutylene groups have two side chain carbon atoms, said solution containing at least about 30 weight percent hydrocarbon solvent boiling primarily in the range of about 200 to 400° F., said hydrocarbon solvent including at least about 15 weight percent based on the total solution, of paraffinic or cycloparaffinic hydrocarbons of said boiling range, said hydrocarbon solvent having a maximum Kauri-Butanol value of about 50, the solvent of said solution being composed of a major weight percent of paraffinic or cycloparaffinic hydrocarbons of said boiling range.

2. The solution of claim 1 wherein the molecular weight of the polyoxybutylene polyol is about 750 to 3000.

3. The solution of claim 1 wherein the polyoxybutylene polyol is comprised predominantly on a weight basis of polyoxybutylene diol.

4. The solution of claim 3 wherein the polyoxybutylene polyol is at least about 40 mole percent of the aliphatic polyol, the molecular weight of the polyoxybutylene polyol is about 750 to 3000, and the hydrocarbon solvent is composed to a major weight extent of paraffinic or cycloparaffinic hydrocarbons.

5. The solution of claim 4 wherein the diisocyanate is tolylene diisocyanate.

6. The solution of claim 1 wherein the diisocyanate is 1 - isocyanato-3-isocyanatomethyl-3,5,5-trimethylcyclohexane.

7. The solution of claim 6 wherein the solvent is at least about 70 weight percent paraffinic or cycloparaffinic hydrocarbons.

8. The solution of claim 4 wherein the aliphatic polyol consists essentially of polyoxybutylene glycol and lower molecular weight aliphatic polyol having a molecular weight of up to about 200 and the major proportion by weight is polyoxybutylene glycol.

9. The solution of claim 8 wherein the lower molecular weight polyol is trimethylol propane.

10. The solution of claim 6 wherein the aliphatic polyol consists essentially of polyoxybutylene glycol and lower molecular weight aliphatic polyol having a molecular weight of up to about 200 and the major proportion by weight is polyoxybutylene glycol, said polyoxybutylene glycol is at least about 40 mole percent of the aliphatic polyol.

11. The solution of claim 10 wherein the lower molecular weight polyol is trimethylol propane.

12. The solution of claim 7 wherein the aliphatic polyol consists essentially of polyoxybutylene glycol and lower molecular weight aliphatic polyol having a molecular weight of up to about 200 and the major proportion by weight is polyoxybutylene glycol, said polyoxybutylene glycol is at least about 40 mole percent of the aliphatic polyol.

13. The solution of claim 12 wherein the lower molecular weight polyol is trimethylol propane.

14. The solution of claim 4 wherein the paraffinic or cycloparaffinic hydrocarbon solvent components are in mineral spirits boiling primarily in the range of about 300 to 400° F.

15. The solution of claim 4 wherein the paraffinic or cycloparaffinic hydrocarbon solvent components are in naphtha boiling primarily in the range of about 200 to 300° F.

16. The solution of claim 8 wherein the paraffinic or cycloparaffinic hydrocarbon solvent components are in mineral spirits boiling primarily in the range of about 300 to 400° F.

17. The solution of claim 8 wherein the paraffinic or cycloparaffinic hydrocarbon solvent components are in naphtha boiling primarily in the range of about 200 to 300° F.

18. The solution of claim 7 wherein the paraffinic or cycloparaffinic hydrocarbon solvent components are in mineral spirits boiling primarily in the range of about 300 to 400° F.

19. The solution of claim 7 wherein the paraffinic or cycloparaffinic hydrocarbon solvent components are in naphtha boiling in the range of about 200 to 300° F.

20. The solution of claim 1 in which the polyurethane is made from said hydrocarbon diisocyanate and aliphatic polyol in amounts such that the isocyanate group to hydroxyl group ratio is about 1.2 to 3:1.

21. The solution of claim 4 in which the polyurethane is made from said hydrocarbon diisocyanate and aliphatic polyol in amounts such that the isocyanate group to hydroxyl group ratio is about 1.2 to 3:1.

22. The solution of claim 6 in which the polyurethane is made from said hydrocarbon diisocyanate and aliphatic polyol in amounts such that the isocyanate group to hydroxyl group ratio is about 1.3 to 2.5:1.

23. The solution of claim 12 in which the polyurethane is made from said hydrocarbon diisocyanate and aliphatic polyol in amounts such that the isocyanate group to hydroxyl group ratio is about 1.3 to 2.5:1.

24. The solution of claim 14 in which the polyurethane is made from said hydrocarbon diisocyanate and aliphatic polyol in amounts such that the isocyanate group to hydroxyl group ratio is about 1.2 to 3:1.

25. The solution of claim 15 in which the polyurethane is made from said hydrocarbon diisocyanate and aliphatic polyol in amounts such that the isocyanate group to hydroxyl group ratio is about 1.2 to 3:1.

26. The solution of claim 16 in which the polyurethane is made from said hydrocarbon diisocyanate and aliphatic polyol in amounts such that the isocyanate group to hydroxyl group ratio is about 1.3 to 2.5:1.

27. The solution of claim 17 in which the polyurethane is made from said hydrocarbon diisocyanate and aliphatic polyol in amounts such that the isocyanate group to hydroxyl group ratio is about 1.3 to 2.5:1.

References Cited

UNITED STATES PATENTS

| | | | |
|---|---|---|---|
| 3,140,273 | 7/1964 | Nischk | 260—77.5 |
| 3,268,488 | 8/1966 | Heiss | 260—77.5 |
| 3,437,622 | 4/1969 | Dahl | 260—24 |
| 3,248,373 | 4/1966 | Barringer | 260—77.5 |

OTHER REFERENCES

Myers & Long: "Film-Forming Compositions," 1967, Part 1, pages 444–448 (priority date of patents listed on pages 513–515).

MORRIS LIEBMAN, Primary Examiner

R. ZAITLEN, Assistant Examiner

U.S. Cl. X.R.

260—77.5

UNITED STATES PATENT OFFICE
CERTIFICATE OF CORRECTION

Patent No. 3,634,306          Dated January 11, 1972

Inventor(s) Herbert M. Schroeder and David W. Teloh

It is certified that error appears in the above-identified patent and that said Letters Patent are hereby corrected as shown below:

Column 2, Line 8, "photochemicallysensitive" should read --photochemically-sensitive--

Column 3, Line 3, "300" should read --3000--

Column 3, Line 57, "arritional" should read --additional--

Column 4, Line 71, "aobut" should read --about--

Column 5, Line 1, "toylene" should read --tolylene--

Column 5, Line 62, "solvents" should read --solutions--

Column 7, Line 59, "2,6" should read --2.6--

Column 9, Line 38, "oxylene" should read --xylene--

Column 13, Line 71, "asid" should read --said--

Signed and sealed this 30th day of May 1972.

(SEAL)
Attest:

EDWARD M. FLETCHER, JR.
Attesting Officer

ROBERT GOTTSCHALK
Commissioner of Patents